US012774886B2

(12) United States Patent
Yuasa

(10) Patent No.: US 12,774,886 B2
(45) Date of Patent: Oct. 27, 2026

(54) SURVEYING INSTRUMENT

(71) Applicant: TOPCON CORPORATION, Tokyo-to (JP)

(72) Inventor: Taichi Yuasa, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 1073 days.

(21) Appl. No.: 17/948,269

(22) Filed: Sep. 20, 2022

(65) Prior Publication Data

US 2023/0098766 A1 Mar. 30, 2023

(30) Foreign Application Priority Data

Sep. 30, 2021 (JP) ................................ 2021-160912
Sep. 30, 2021 (JP) ................................ 2021-160913

(51) Int. Cl.
*G01C 15/00* (2006.01)
*G01C 15/06* (2006.01)

(52) U.S. Cl.
CPC ........... *G01C 15/006* (2013.01); *G01C 15/06* (2013.01)

(58) Field of Classification Search
CPC .... G01C 15/006; G01C 15/06; G01C 15/002; G01S 7/4812; G01S 7/4814; G01S 7/4816; G01S 7/4817; G01S 17/42
USPC ........................................................ 356/4.08
See application file for complete search history.

(56) References Cited

U.S. PATENT DOCUMENTS 9,719,781 B2 * 8/2017 Nishita .................... G01C 1/04
12,209,862 B2 * 1/2025 Kotzur ..................... G01C 1/04
2012/0262550 A1 10/2012 Bridges
2015/0092181 A1 * 4/2015 Nishita .................... G01C 1/04 356/4.01
2021/0041237 A1 2/2021 Yuasa
2021/0124049 A1 * 4/2021 Wohlgenannt ........ G01S 7/4865
2022/0146621 A1 5/2022 Essling

FOREIGN PATENT DOCUMENTS

DE 102019002516 A1 10/2020
JP 2018-91764 A 6/2018
JP 2021-25993 A 2/2021

* cited by examiner

*Primary Examiner* — Isam A Alsomiri
(74) *Attorney, Agent, or Firm* — Nields, Lemack & Frame, LLC

(57) ABSTRACT

A surveying instrument include a distance measuring light projecting module having a light emitting module configured to project a distance measuring light to an object and a one-dimensional diffusion optical member configured to diffuse the distance measuring light in a one-dimensional direction, a distance measuring light receiving module having a photodetector configured to receive a reflected distance measuring light from the object, and an arithmetic control module configured to control the light emitting module and calculate a distance to the object based on a light reception result of the reflected distance measuring light with respect to the photodetector, wherein the light emitting module has at least two light emitters laminated in one direction, and the one-dimensional diffusion optical member is configured to diffuse the distance measuring light in a laminating direction of the light emitters.

20 Claims, 10 Drawing Sheets

SURVEYING INSTRUMENT

BACKGROUND OF THE INVENTION

The present invention relates to a surveying instrument which can acquire three-dimensional coordinates of an object.

A surveying instrument such as a laser scanner or a total station has an electronic distance meter which detects a distance to an object which is to be measured by the prism distance measurement using reflecting a prism having the retro-reflective property as the object or the non-prism distance measurement using no reflecting prism.

There are surveying instruments which use a multi-stack laser as a light source of the surveying instrument, in which a plurality of light emitters, for instance, laser diodes are laminated (stacked) and emit lights simultaneously. The multi-stack laser purposes for an increase a light amount of a distance measuring light by combining lights from the plurality of light emitters and for an increase in distance capable of being measured.

However, even if the respective light emitters are controlled in such a manner that the respective light emitters emit lights simultaneously, there may be a gap in timing of the light emission due to manufacturing errors and the like. Further, due to this gap, a difference of, for instance, approximately ±10 mm may be produced in a distance measurement value for each light emitter.

On the other hand, in case of the prism distance measurement using a reflecting prism or the like having the retro-reflective property as an object, in a state where a beam profile (an intensity distribution) of the distance measuring light being maintained a distance measuring light is reflected by the prism. Therefore, in a case where the prism measurement using the multi-stack laser as a light source is performed, errors could possibly occur in distance measurement results depending on which part of the distance measuring light is reflected, that is, the light of which light emitter is a light to be reflected.

SUMMARY OF INVENTION

It is an object of the present invention to provide a surveying instrument which achieves for uniforming beam profiles of distance measuring lights and reducing errors in distance measurement results.

To attain the object as described, a surveying instrument according to the present invention comprises a distance measuring light projecting module having a light emitting module configured to project a distance measuring light to an object and a one-dimensional diffusion optical member configured to diffuse the distance measuring light in a one-dimensional direction, a distance measuring light receiving module having a photodetector configured to receive a reflected distance measuring light from the object, and an arithmetic control module configured to control the light emitting module and calculate a distance to the object based on a light reception result of the reflected distance measuring light with respect to the photodetector, wherein the light emitting module has at least two light emitters laminated in one direction, and the one-dimensional diffusion optical member is configured to diffuse the distance measuring light in a laminating direction of the light emitters.

Further, in the surveying instrument according to a preferred embodiment, the one-dimensional diffusion optical member is a one-dimensional diffusion optical element.

Further, in the surveying instrument according to a preferred embodiment, the one-dimensional diffusion optical member is a slit plate having a slit extending in a direction orthogonal to a laminating direction of the light emitters.

Further, in the surveying instrument according to a preferred embodiment, the object is a corner cube having the retro-reflective property, and the distance measuring light diffused by the one-dimensional diffusion optical member is configured in such a manner that an overlapping portion in which lights emitted from the respective light emitters are all overlapped is formed, and the arithmetic control module performs the distance measurement of the corner cube by the overlapping portion.

Further, in the surveying instrument according to a preferred embodiment, the surveying instrument further comprises a frame unit configured to horizontally rotate around a horizontal rotation shaft by a horizontal rotation motor, a scanning mirror configured to vertically rotate around a vertical rotation shaft by a vertical rotation motor provided in the frame unit, to irradiate the corner cube with the distance measuring light, and to receive the reflected distance measuring light from the corner cube, a horizontal angle encoder configured to detect a horizontal angle of the frame unit, and a vertical angle encoder configured to detect a vertical angle of the scanning mirror, wherein the arithmetic control module is configured to calculate a gravity center position of the corner cube based on a received light amount, a horizontal angle, and a vertical angle of the reflected distance measuring light at the time of scanning the corner cube with the distance measuring light and perform the angle measurement of the corner cube based on the gravity center position.

Further, in the surveying instrument according to a preferred embodiment, the arithmetic control module is configured to determine whether the corner cube has been performed the distance measurement with the overlapping portion based on a received light amount of the reflected distance measuring light, and discard a distance measurement result in which distance measurement is determined to have not been performed with the overlapping portion.

Further, in the surveying instrument according to a preferred embodiment, the arithmetic control module is configured to calculate a gravity center position of the corner cube based on a light amount distribution obtained at the time of scanning the corner cube with the distance measuring light, to determine whether the corner cube has been performed the distance measurement with the overlapping portion based on whether the corner cube is within a preset threshold range set in advance to the gravity center position, and to discard a distance measurement result in which distance measurement is determined to have not been performed by the overlapping portion.

Further, in the surveying instrument according to a preferred embodiment, the distance measuring light projecting module further comprises a driving mechanism, and the driving mechanism is configured to insert or remove the one-dimensional diffusion optical member with respect to an optical axis of the distance measuring light.

Further, in the surveying instrument according to a preferred embodiment, the distance measuring light receiving module further has a light receiving prism configured to internally reflect the reflected distance measuring light more than once and then cause the reflected distance measuring light to be received by the photodetector.

Further, in the surveying instrument according to a preferred embodiment, the slit plate has one slit hole.

Further, in the surveying instrument according to a preferred embodiment, the slit plate is a plurality of slit holes.

Furthermore, in the surveying instrument according to a preferred embodiment, an aperture width of the slit hole is changeable in a laminating direction of the light emitters, and the arithmetic control module is configured to change the aperture width of the slit hole in the laminating direction of the light emitters.

According to the present invention, a surveying instrument comprises a distance measuring light projecting module having a light emitting module configured to project a distance measuring light to an object and a one-dimensional diffusion optical member configured to diffuse the distance measuring light in a one-dimensional direction, a distance measuring light receiving module having a photodetector configured to receive a reflected distance measuring light from the object, and an arithmetic control module configured to control the light emitting module and calculate a distance to the object based on a light reception result of the reflected distance measuring light with respect to the photodetector, wherein the light emitting module has at least two light emitters laminated in one direction, and the one-dimensional diffusion optical member is configured to diffuse the distance measuring light in a laminating direction of the light emitters. As a result, it is possible to superimpose the respective distance measuring lights, uniform beam profiles of the distance measuring lights, and obtain a uniform distance measurement result irrespective of the number of the laminated light emitters.

DETAILED DESCRIPTION OF THE PREFERRED EMBODIMENT

Figure 1:
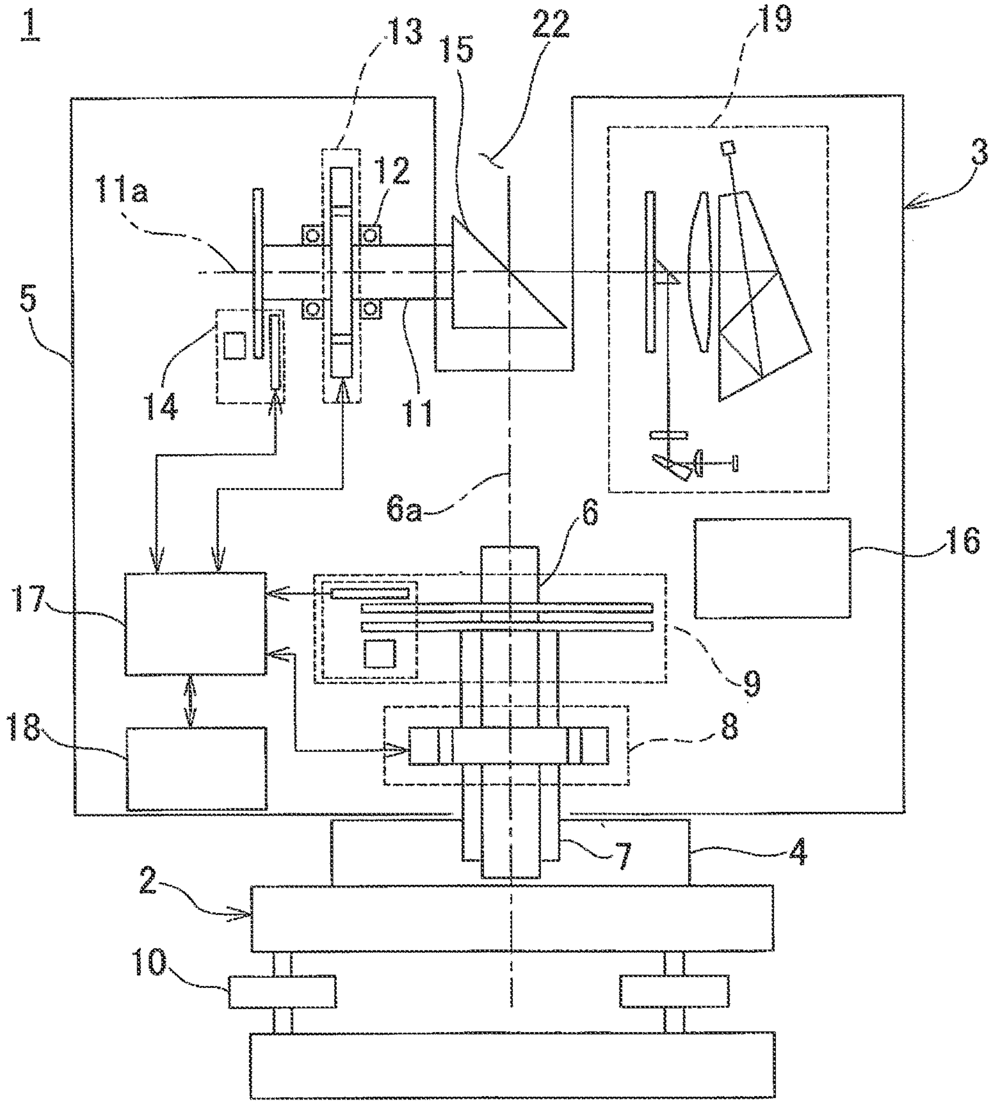
FIG. 1 is a front sectional drawing to show a surveying instrument according to an embodiment of the present invention.

A description will be given below on embodiments of the present invention by referring to the attached drawings.

First, by referring to FIG. 1, a description will be given on a surveying instrument according to a first embodiment of the present invention.

A surveying instrument 1 is, for instance, a laser scanner. The surveying instrument 1 is constituted of a leveling module 2 mounted on a tripod (not shown) and a surveying instrument main body 3 mounted on the leveling module 2.

The leveling module 2 has leveling screws 10, and the surveying instrument main body 3 is leveled up by the leveling screws 10.

The surveying instrument main body 3 includes a fixing unit 4, a frame unit 5, a horizontal rotation shaft 6, a horizontal rotation bearing 7, a horizontal rotation motor 8 as a horizontal rotation driving module, a horizontal angle encoder 9 as a horizontal angle detector, a vertical rotation shaft 11, a vertical rotation bearing 12, a vertical rotation motor 13 as a vertical rotation driving module, a vertical angle encoder 14 as a vertical angle detector, a scanning mirror 15 which is a vertical rotation module, an operation panel 16 which serves as both an operation module and a display module, an arithmetic control module 17, a storage module 18, a distance measuring unit 19 and others. It is to be noted that, as the arithmetic control module 17, a CPU specialized for this instrument or a general-purpose CPU is used.

The horizontal rotation bearing 7 is fixed to the fixing unit 4. The horizontal rotation shaft 6 has a vertical axis 6*a*, and the horizontal rotation shaft 6 is rotatably supported by the horizontal rotation bearing 7. Further, the frame unit 5 is supported by the horizontal rotation shaft 6, and the frame unit 5 integrally rotates with the horizontal rotation shaft 6 in the horizontal direction.

The horizontal rotation motor 8 is provided between the horizontal rotation bearing 7 and the frame unit 5, and the horizontal rotation motor 8 is controlled by the arithmetic control module 17. The arithmetic control module 17 rotates the frame unit 5 around the axis 6*a* by the horizontal rotation motor 8.

A relative rotation angle of the frame unit 5 with respect to the fixing unit 4 is detected by the horizontal angle encoder 9. A detection signal from the horizontal angle encoder 9 is input to the arithmetic control module 17, and the horizontal angle data is calculated by the arithmetic control module 17. The arithmetic control module 17 performs the feedback control of the horizontal rotation motor 8 based on the horizontal angle data.

Further, in the frame unit 5, the vertical rotation shaft 11 having a horizontal axis 11*a* is provided. The vertical rotation shaft 11 can rotate via the vertical rotation bearing 12. It is to be noted that an intersection of the axis 6*a* and the axis 11*a* is a projecting position for a distance measuring light, and the intersection is an origin of a coordinate system of the surveying instrument main body 3.

A recess portion 22 is formed in the frame unit 5. One end portion of the vertical rotation shaft 11 extends to the inside of the recess portion 22. Further, the scanning mirror 15 is fixed to the one end portion, and the scanning mirror 15 is accommodated in the recess portion 22. Further, the vertical angle encoder 14 is provided at the other end portion of the vertical rotation shaft 11.

The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13. Further, and the scanning mirror 15 is rotated around the axis 11*a*.

A rotation angle of the scanning mirror 15 is detected by the vertical angle encoder 14, and a detection signal is input to the arithmetic control module 17. The arithmetic control module 17 calculates the vertical angle data of the scanning mirror 15 based on the detection signal, and performs the feedback control of the vertical rotation motor 13 based on the vertical angle data.

Further, the horizontal angle data and the vertical angle data calculated by the arithmetic control module 17, and the measurement results are stored in the storage module 18. As the storage module 18, various types of storage devices are used. These storage devices include: an HDD as a magnetic storage device, a CD or DVD as an optical storage device, a memory card and a USB memory as a semiconductor storage device, and other storage devices. The storage module 18 may be attachable to and detachable from the frame unit 5. Alternatively, the storage module 18 may enable transmitting the data to an external storage device or an external data processing device via a not shown communicating means.

In the storage module 18, various types of programs are used. These programs include: a control program for controlling the driving of light emitters of a light emitting module (to be described later), a sequence program for controlling a distance measuring operation, a calculation program for calculating a distance by the distance measuring operation, a calculation program for calculating an angle based on the horizontal angle data and the vertical angle data, a calculation program for calculating three-dimensional coordinates of a desired measuring point based on a distance and an angle, a calculation program for calculating the center of gravity of an object based on a measurement result, a control program for discarding a distance measurement result having an error based on a received light amount of a reflected distance measuring light and other programs. Further, when the various types of programs stored in the storage module 18 are executed by the arithmetic control module 17, various types of processing are performed.

The operation panel 16 is, for instance, a touch panel. The operation panel 16 serves as both an operation module which performs, for instance, changing distance measurement instructions or measurement conditions such as a measuring point interval and a display module which displays distance measurement results, images and the like.

Figure 2A:
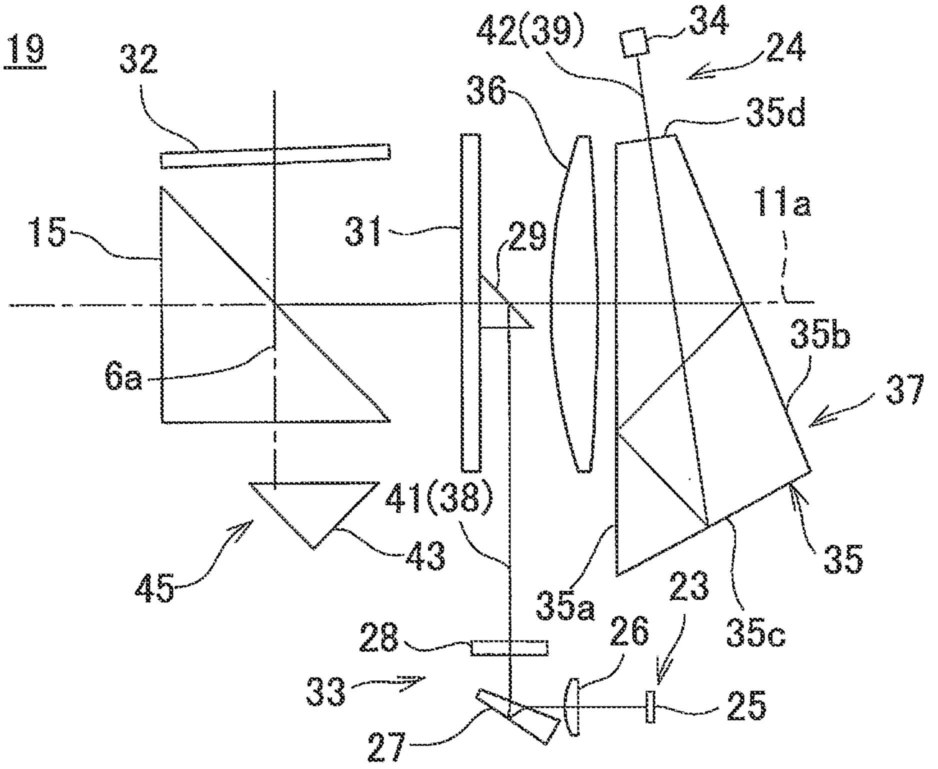
FIG. 2A and FIG. 2B are block diagrams each to show a distance measuring unit according to a first embodiment of the present invention.
Figure 2B:
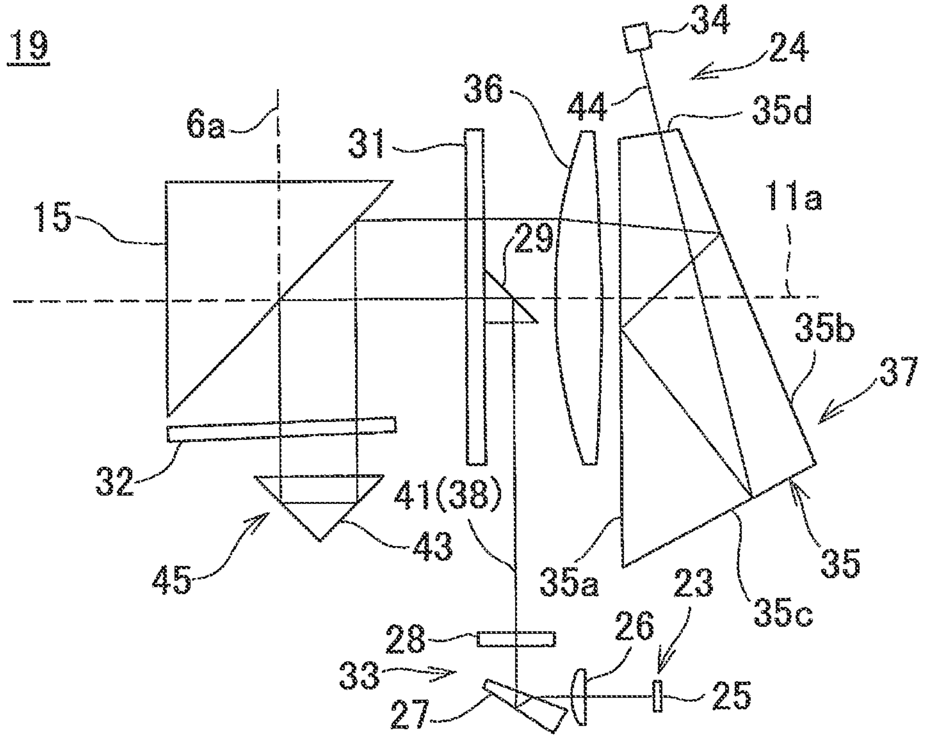

Next, a description will be given on the distance measuring unit 19 by referring to FIG. 2A and FIG. 2B.

The distance measuring unit 19 has a distance measuring light projecting module 23 and a distance measuring light receiving module 24. It is to be noted that the distance measuring light projecting module 23 and the distance measuring light receiving module 24 configure a distance measuring module.

The distance measuring light projecting module 23 has a distance measuring optical axis 38. Further, the distance measuring light projecting module 23 has a light emitting module 25, a collimator lens 26, the beam shaping optical element 27 which provided on the distance measuring optical axis 38, a one-dimensional diffusion optical element 28 as a one-dimensional diffusion optical member provided on a reflected optical axis of the beam shaping optical element 27, a reflecting prism 29 as a deflection member, and a fixing member 31 configured to fix the reflecting prism 29. Further, the scanning mirror 15 is provided on the distance measuring optical axis 38 reflected by the reflecting prism 29. The fixing member 31 is formed with the use of a transparent material such as a glass plate. Further, a window unit 32 which is formed of a transparent material and integrally rotates with the scanning mirror 15 is provided on a reflected optical axis of the scanning mirror 15.

It is to be noted that the collimator lens 26, the beam shaping optical element 27, the one-dimensional diffusion optical element 28, the reflecting prism 29, and the like constitute a light projecting optical system 33. Further, in the first embodiment, the distance measuring optical axis 38, the distance measuring optical axis 38 reflected by the beam shaping optical element 27, and the distance measuring optical axis 38 reflected by the reflecting prism 29 are generically referred to as the distance measuring optical axis 38.

Further, a distance measuring light receiving module 24 has a light receiving optical axis 39. The distance measuring light receiving module 24 has a photodetector 34 and a light receiving prism 35 provided on the light receiving optical axis 39, and has a focusing lens 36 with a predetermined NA provided on the light receiving optical axis 39 reflected by the light receiving prism 35. It is to be noted that the light receiving prism 35 and the focusing lens 36 constitute a light receiving optical system 37. Further, in the first embodiment, the light receiving optical axis 39 and a reflected optical axis reflected by the light receiving prism 35 are generically referred to as a light receiving optical axis 39.

The light emitting module 25 is a multi-stack laser light source in which a plurality of light emitters, for instance, laser diodes (LDs) are laminated. The light emitting module 25 is constituted of, for instance, three laminated (stacked) light emitters, and controlled in such a manner that laser beams are simultaneously pulse-emitted from the respective light emitters and a combined pulsed light is projected as a distance measuring light 41 (to be described later). When the three light emitters simultaneously emit lights and the combined distance measuring light 41 is projected, a light amount of the distance measuring light 41 emitted from the light emitting module 25 is assured, and the long-distance measurement by the surveying instrument 1 is enabled.

It is to be noted that the number of the light emitters constituting the light emitting module 25 may be two, four, or five. The number of the light emitters is appropriately set in correspondence with an assumed distance to the object.

The beam shaping optical element 27 is, for instance, a reflective or transmissive anamorphic prism. The distance measuring light 41 projected from the light emitting module 25 and turned to a parallel light flux by the collimator lens 26. In this time, the distance measuring light 41 has an elliptical beam shape, and the beam shaping optical element 27 is configured to correct the elliptical distance measuring light 41 into a circular shape and more deflect the distance measuring light 41 at a right angle.

The one-dimensional diffusion optical element 28 is configured to diffuse the distance measuring light 41 deflected by the beam shaping optical element 27 in a predetermined direction (a one-dimensional direction). In the first embodiment, a direction of diffusion of the distance measuring light 41 by the one-dimensional diffusion optical element 28 is a laminating direction (a stacking direction) of the respective light emitters of the light emitting module 25.

It is to be noted that, as the one-dimensional diffusion optical element 28, it is possible to use various lenses or optical elements. These lenses or optical elements include: a cylindrical lens, a lenticular lens, a micro-cylindrical lens array, an elliptical diffusion film, a binary optical element, a diffractive optical element and others. The micro-cylindrical lens array is obtained by arranging tiny cylindrical lenses in an array. Further, in the following description, as the one-dimensional diffusion optical element 28, any one of an elliptical diffusion film, a binary optical element, and a diffractive optical element is used.

The distance measuring unit 19 is controlled by the arithmetic control module 17. When the pulsed distance measuring light 41 is projected onto the distance measuring optical axis 38 from the light emitting module 25, the distance measuring light 41 is turned to a parallel light flux by the collimator lens 26 and deflected at a right angle while correcting the beam shape of the distance measuring light 41 by the beam shaping optical element 27. The distance measuring light 41 reflected by the beam shaping optical element 27 is diffused in a one-dimensional direction by the one-dimensional diffusion optical element 28, and reflected at a right angle by the reflecting prism 29. The distance measuring optical axis 38 of the distance measuring light 41 projected from the reflecting prism 29 via the fixing member 31 coincides with the axis 11*a*. And the distance measuring light 41 is deflected at a right angle by the scanning mirror 15 and irradiated to the object via the window unit 32. By rotating the scanning mirror 15 around the axis 11*a*, the distance measuring light 41 becomes orthogonal to the axis 11*a*, and the distance measuring light 41 is rotated (used for a scan) within a plane including the axis 6*a*.

It is to be noted that the window unit 32 is tilted at a predetermined angle with respect to the distance measuring optical axis 38 in such a manner that the distance measuring light 41 reflected by the window unit 32 does not enter the photodetector 34.

The distance measuring light 41 reflected by the object (hereinafter a reflected distance measuring light 42) is reflected at a right angle by the scanning mirror 15, and the reflected distance measuring light 42 is received by the photodetector 34 through the light receiving optical system 37. The photodetector 34 is, for instance, an avalanche photodiode (APD) or an equivalent photoelectric conversion element.

The arithmetic control module 17 performs the distance measurement for each pulse of the distance measuring light 41 based on a time lag between a light emission timing of the light emitting module 25 and a light reception timing of the photodetector 34 (that is, a round-trip time of a pulsed light) and a light velocity (Time of Flight). It is to be noted that the operation panel 16 can change the light emission timing of the light emitting module 25, that is, a pulse interval.

It is to be noted that an internal reference light optical system (to be described later) is provided in the distance measuring unit 19. By performing the distance measurement based on a time lag between the light reception timing for an internal reference light (to be described later) received from the internal reference light optical system and the reception timing of a reflected distance measuring light and the light velocity, the distance measuring unit 19 enables the further accurate distance measurement.

The frame unit 5 and the scanning mirror 15 are rotated at a constant speed, respectively. A two-dimensional scan by the distance measuring light 41 is performed by the cooperation between the vertical rotation of the scanning mirror 15 and the horizontal rotation of the frame unit 5. Further, the distance measurement data (a slope distance) is acquired by the distance measurement for each pulsed light, by detecting a vertical angle and a horizontal angle for each pulsed light by the vertical angle encoder 14 and the horizontal angle encoder 9, the arithmetic control module 17 enables calculating the vertical angle data and the horizontal angle data. Three-dimensional coordinates of the object and the three-dimensional point cloud data corresponding to the object can be acquired based on the vertical angle data, the horizontal angle data, and the distance measurement data.

Next, a description will be given on the light receiving optical system 37. It is to be noted that, in FIG. 2A and FIG. 2B, only a chief ray (the distance measuring optical axis 38) of the distance measuring light 41 and a chief ray (the light receiving optical axis 39) of the reflected distance measuring light 42 alone are shown.

The light receiving prism 35 is a square prism having a predetermined refractive index, Further, the receiving prism 35 has a first surface 35*a* which the reflected distance measuring light 42 transmitted through the focusing lens 36 enters, a second surface 35*b* which reflects the reflected distance measuring light 42 transmitted through a plane of the first surface 35*a*, a third surface 35*c* which the reflected distance measuring light 42 reflected by the second surface 35*b* and the first surface 35*a* enters, and a fourth surface 35*d* as a transmission surface which the reflected distance measuring light 42 reflected by the third surface 35*c* is transmitted through. The reflected distance measuring light 42 transmitted through the fourth surface 35*d* enters the photodetector 34. It is to be noted that, the third surface 35*c* reflects the reflected distance measuring light 42 in such a manner that the reflected distance measuring light 42 crossed the reflected distance measuring light 42 entered the first surface 35*a*.

Further, a reference prism 43 having the retro-reflective property is provided below the scanning mirror 15. In a process of the rotational irradiation of the distance measuring light 41 via the scanning mirror 15, a part of the distance measuring light 41 enters the reference prism 43. The distance measuring light 41 retro-reflected by the reference prism 43 is configured to enter the light receiving optical system 37 via the scanning mirror 15, and to be received by the photodetector 34.

Here, an optical path length from the light emitting module 25 to the reference prism 43 and an optical path length from the reference prism 43 to the photodetector 34 are known. Therefore, the distance measuring light 41 reflected by the reference prism 43 can be used as an internal reference light 44. The scanning mirror 15 and the reference prism 43 configure an internal reference light optical system 45.

Next, by referring to FIG. 3 to FIG. 6, a description will be given on a case where the measurement is performed by the surveying instrument 1 having the distance measuring unit 19. Various types of operations of the distance measuring unit 19 are performed when the arithmetic control module 17 executes various types of programs. It is to be noted that a case where the prism measurement is performed will be described below.

The object, for instance, a corner cube 46 is irradiated with the distance measuring light 41 emitted from each light emitter of the light emitting module 25 via the collimator lens 26, the beam shaping optical element 27, the one-dimensional diffusion optical element 28, the reflecting prism 29, the fixing member 31, and the scanning mirror 15. The reflected distance measuring light 42 which has been reflected by the corner cube 46 and entered the light receiving optical system 37 via the scanning mirror 15 is refracted in a process of being transmitted through the focusing lens 36 and the first surface 35*a*. Further, the reflected distance measuring light 42 is sequentially reflected by the second surface 35*b* and the first surface 35*a* in the light receiving prism 35, and enters the third surface 36*c*. Further, the reflected distance measuring light 42 is reflected by the third surface 35*c* so that the reflected distance measuring light 42 crosses the reflected distance measuring light 42 entered the first surface 35*d*, and the reflected distance measuring light 42 is then transmitted through the fourth surface 35*d*, and received by the photodetector 34.

The arithmetic control module 17 calculates three-dimensional coordinates of the corner cube 46 based on a distance measurement result of the distance measuring unit 19 and detection results of the horizontal angle encoder 9 and the vertical angle encoder 14.

It is to be noted that the measurement of the corner cube 46 may be performed by scanning the whole circumference or the periphery of the corner cube 46 with the distance measuring light 41 and determining a position at which the reflected distance measuring light 42 has been received as a position of the corner cube 46.

Figure 3A:
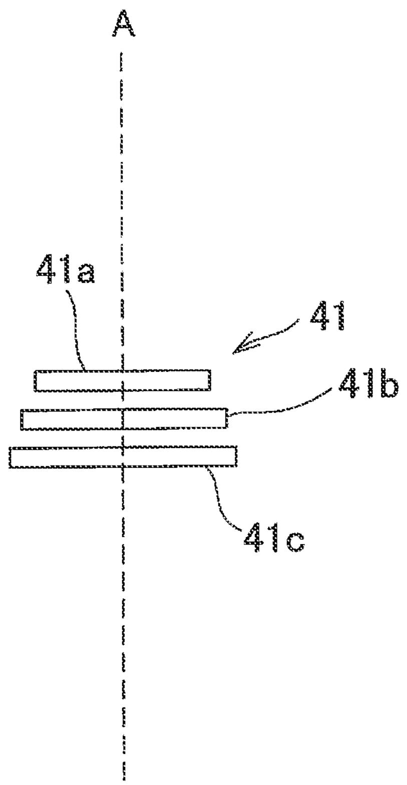
FIG. 3A is a beam profile of a distance measuring light when a one-dimensional diffusion optical element is not used.
Figure 3B:
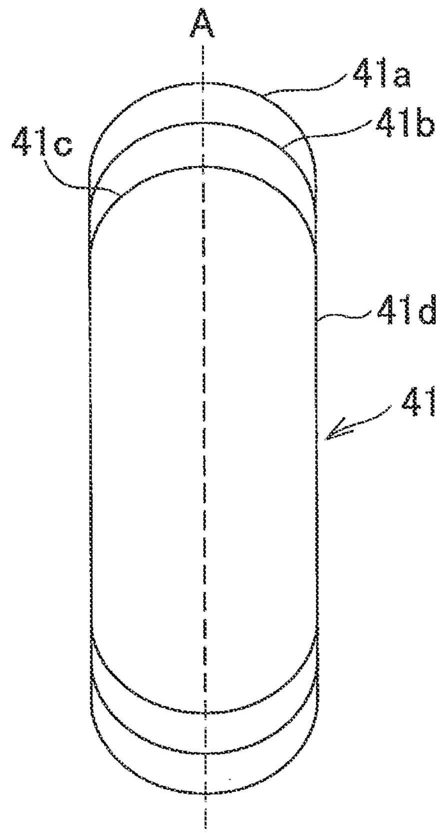
FIG. 3B is a beam profile of the distance measuring light when the one-dimensional diffusion optical element is used.

Here, FIG. 3A shows a beam profile of the distance measuring light 41 in a case where the one-dimensional diffusion optical element 28 is not used, and FIG. 3B shows a beam profile of the distance measuring light 41 in a case where the one-dimensional diffusion optical element 28 is used. Further, FIG. 3C shows a comparison between beam profile section intensities of the respective distance measuring lights 41 at a position of a line "A", in which solid lines represent a case where the one-dimensional diffusion optical element 28 is used and dashed lines represent a case where the one-dimensional diffusion optical element 28 is not used.

Figure 3C:
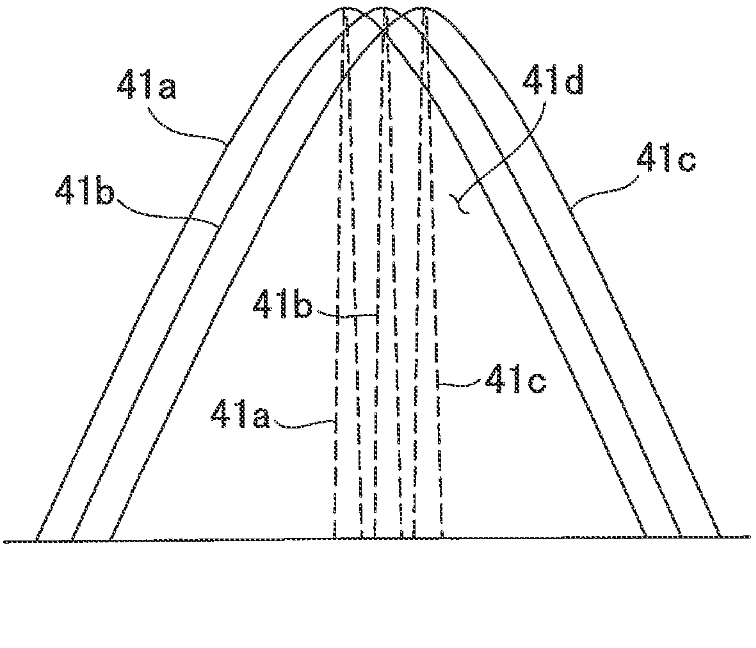
FIG. 3C is profile section intensities of respective distance measuring lights along line "A".

As shown in FIG. 3A to FIG. 3C, in a case where the one-dimensional diffusion optical element 28 is not used, the distance measuring lights 41 of the respective light emitters are independently projected with the shapes of the distance measuring light 41 being maintained. Further, since the beam profile section intensities at that time are independently detected for each of the distance measuring lights 41 of the respective light emitters, beam intensities of beam sections of the distance measuring lights 41 greatly vary.

On the other hand, in a case where the one-dimensional diffusion optical element 28 is used, the distance measuring lights 41 of the respective light emitters are expanded in a one-dimensional direction, for instance, a laminating direction (a stacking direction) of the light emitters, and the distance measuring lights 41 of the respective light emitters are superimposed, averaged, and then projected. Further, since the profile section intensities at that time are detected with the distance measuring lights 41 of the respective light emitters being superimposed and averaged, the beam intensities of the beam sections of the distance measuring lights 41 are substantially constant.

Figure 4A:
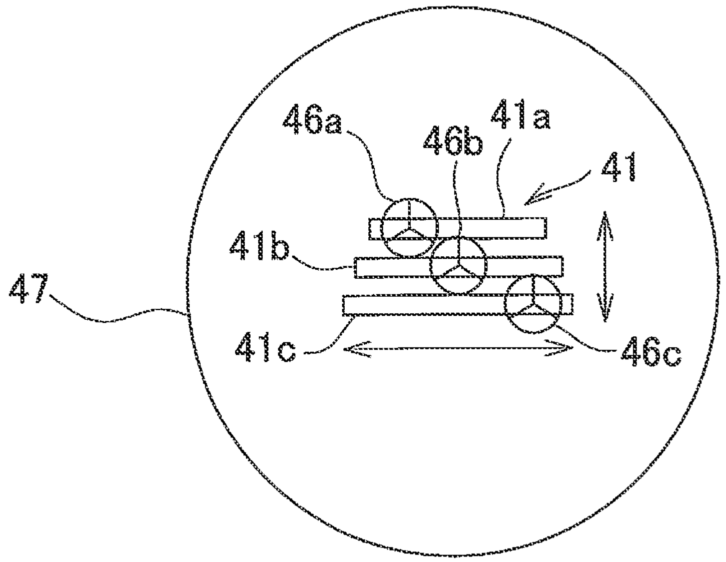
FIG. 4A is an explanatory drawing to show a relationship between a distance measuring light and a corner cube when no one-dimensional diffusion optical element is no used.
Figure 4B:
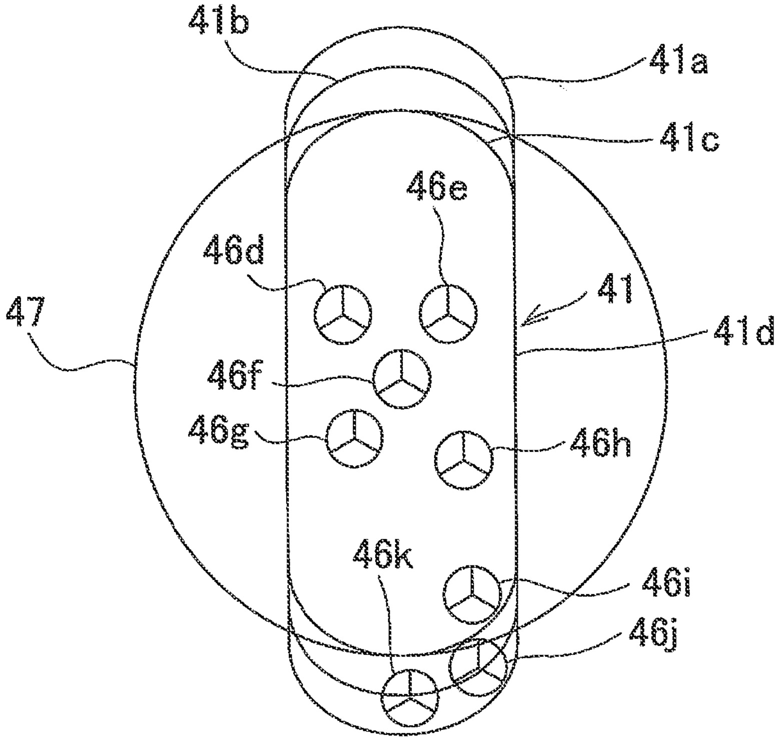
FIG. 4B is an explanatory drawing to show a relationship between the distance measuring light and the corner cube when the one-dimensional diffusion optical element is used.

Further, FIG. 4A and FIG. 4B show a relationship in position between the corner cube 46 and the beam profiles of the distance measuring lights 41 in a case where the one-dimensional diffusion optical element 28 is used and in a case where the one-dimensional diffusion optical element 28 is not used. It is to be noted that, in FIG. 4A and FIG. 4B, a reference numeral 47 denotes a light receiving range of the photodetector 34.

As shown in FIG. 4A, the distance measuring light 41 consists of distance measuring lights 41*a*, 41*b* and 41*c* pulse-emitted from three light emitters. On the other hand, due to an error or the like of the light emission timing of each light emitter based on a manufacturing error or the like, a distance measurement result based on the distance measuring lights 41*a*, 41*b* and 41*c* produces errors.

Therefore, in a case where the corner cube 46 has reflected the distance measuring light 41*a* (a corner cube 46*a*) and in a case where the corner cube 46 has reflected the distance measuring light 46*c* (a corner cube 46*c*), an error of approximately ±5 mm is produced with respect to a case where the corner cube 46 has reflected the distance measuring light 41*b* (a corner cube 46*b*).

On the other hand, as shown in FIG. 4B, the distance measuring lights 41*a*, 41*b* and 41*c* diffused by the one-dimensional diffusion optical element 28 only in the laminating direction (one direction) of the light emitters are superimposed on each other, combined, and uniformed. Further, an overlapping portion 41*d*, where all the distance measuring lights 41*a*, 41*b* and 41*c* are superimposed on each other, is received within the light receiving range 47.

If the distance measuring light 41 from the overlapping portion 41*d* is reflected, no matter which corner cube 46 (the corner cube 46*d*, 46*e*, 46*f*, 46*g*, 46*h* and 46*i*) reflects the distance measuring light 41, as shown in FIG. 3C, the beam profile of the distance measuring light 41 is substantially uniformed, and hence no error is produced in a distance measurement result.

On the other hand, in a case where the corner cube 46 is measured while performing a scan with the distance measuring light 41 by the cooperation of the frame unit 5 and the scanning mirror 15, like corner cubes 46*k* and 46*j*, the distance measuring light 41 from a portion where any one of the distance measuring lights 41*a*, 41*b* and 41*c* or any two of the distance measuring lights 41*a*, 41*b* and 41*c* overlap each other may be reflected by the corner cube 46.

In this case, as compared with a case where the distance measuring light 41 of the overlapping portion 46*d* is reflected by the corner cube 46, an error is produced in a distance measurement result. On the other hand, a difference is produced in received light amount when the photodetector 34 has received the reflected distance measuring light 42. Therefore, the arithmetic control module 17 is capable of determining whether the distance measuring light 41 of the overlapping portion 41*d* has been reflected by the corner cube 46 based on the difference in received light amount of the reflected distance measuring light 42. Further, the arithmetic control module 17 is capable of discarding a distance measurement result as an erroneous distance measurement result, in which the distance measurement has been determined which have been performed with the distance measuring light 41 of any other portion than the overlapping portion 41*d*.

Alternatively, based on a light amount distribution when the corner cube 46 has been scanned with the distance measuring light 41 by the arithmetic control module 17, whether the corner cube 46 has been performed the distance measurement by the distance measuring light 41 of the overlapping portion 41*d*. In this case, the arithmetic control module 17 calculates a horizontal angle and a vertical angle of a gravity center position of the corner cube 46 based on a horizontal angle and a vertical angle of each point at which a light amount distribution has been obtained, and can determine whether the corner cube 46 has been measured the distance with the distance measuring light 41 of the overlapping portion 41*d* based on whether the corner cube 46 is located within a predetermined angle range (a threshold range set in advance) centered on the gravity center position.

The arithmetic control module 17 can calculate a gravity center position of the corner cube 46 based on the horizontal angle and the vertical angle of each point from which the light amount distribution has been obtained. Further, the arithmetic control module 17 can determine whether each distance measurement result is within the threshold range from the gravity center position of the corner cube 46 based on an angle threshold value as set in advance, and discarding the distance measurement result determined to be out of the threshold range as an erroneous distance measurement result.

Figure 5A:
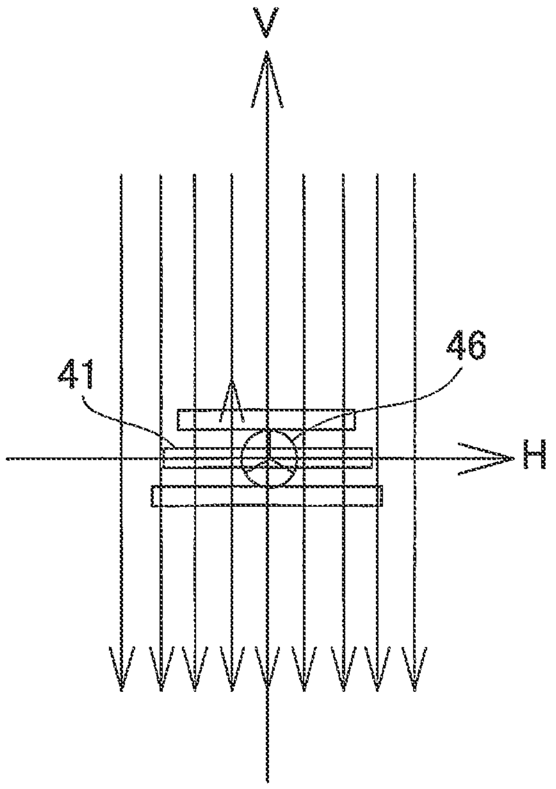
FIG. 5A is an explanatory drawing to show a case where the corner cube is scanned with the distance measuring light when the one-dimensional diffusion optical element is no used.
Figure 5B:
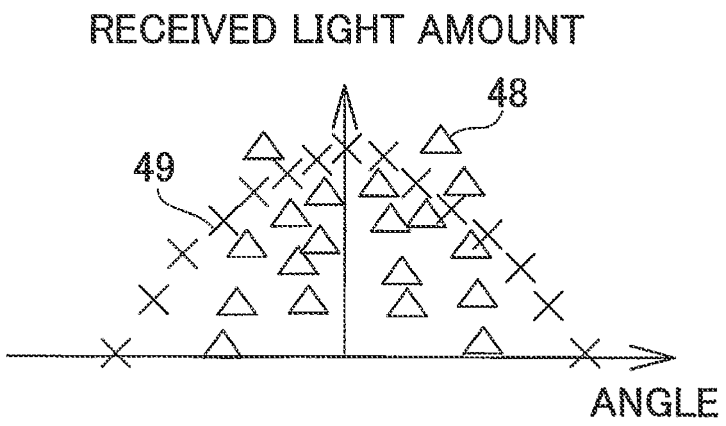
FIG. 5B is a distribution diagram to show a relationship between an angle and a received light amount in this case.
Figure 6A:
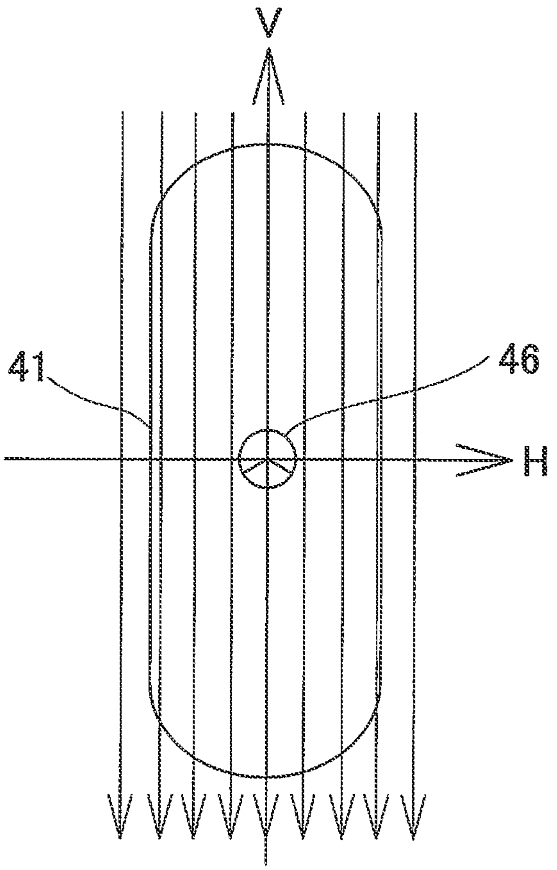
FIG. 6A is an explanatory drawing to show a case where the corner cube is scanned with the distance measuring light when the one-dimensional diffusion optical element is used.

FIG. 5A and FIG. 5B are graphs to show a relationship between a horizontal angle of the frame unit 5, a vertical angle of the scanning mirror 15, and a received light amount of the reflected distance measuring light 42 in a case where the corner cube 46 is measured while scanning the distance measuring light 41 without using the one-dimensional diffusion optical element 28. Further, FIG. 6A and FIG. 6B are graphs to show a relationship between a horizontal angle of the frame unit 5, a vertical angle of the scanning mirror 15, and a received light amount of the reflected distance measuring light 42 in a case where the corner cube 46 is measured while scanning the distance measuring light 41 with the one-dimensional diffusion optical element 28 provided.

Figure 6B:
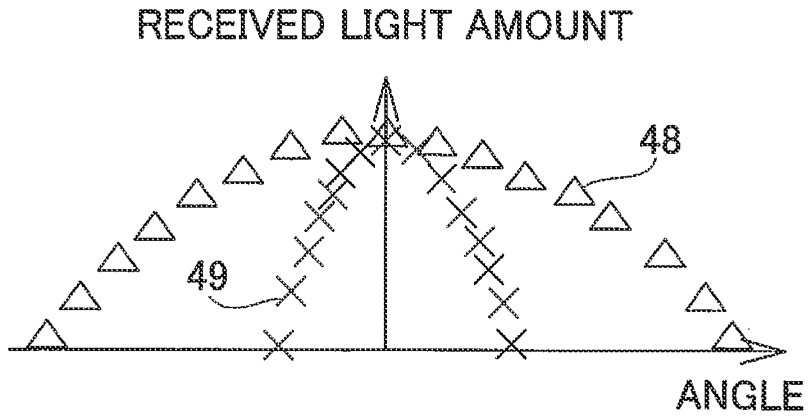
FIG. 6B is a distribution diagram to show a relationship between an angle and a received light amount in this case.

It is to be noted that, in FIG. 5B and FIG. 6B, triangular plots 48 represent received light amounts in a "V" axis direction (a vertical direction) and cross-shaped plots 49 represent received light amounts in an "H" axis direction (a horizontal direction).

As shown in FIG. 5B, in a case where the one-dimensional diffusion optical element 28 is not provided, by discretely sampling light reception signals, the received light amounts in the H axis direction have a continuous distribution, but the received light amounts in the "V" axis direction, that is, the received light amounts in the laminating direction of the light emitters have a discontinuous distribution. Therefore, an error at the time of calculating of the gravity center position of the corner cube 46 increases, and an error is also produced in an angle measurement result of the corner cube 46.

On the other hand, as shown in FIG. 6B, in a case where the one-dimensional diffusion optical element 28 is provided, by discretely sampling the light reception signals, both the received light amounts in the "V" axis direction and the received light amount in the "H" axis direction have continuous distributions. Therefore, it is possible to prevent an error at the time of calculating of the gravity center position of the corner cube 46, and likewise prevent an error in an angle measurement result of the corner cube 46.

As described above, in the first embodiment, the multi-stack laser light source which has a plurality of light emitters laminated in one direction as the light emitting module 25 and causes the respective light emitters to simultaneously emit lights is used. Therefore, by totaling light reception signals when the distance measuring lights 41 are projected from the respective light emitters and the respective reflected distance measuring lights 42 are received by the photodetector 34, it is possible to substantially increase the received light amounts to correspond with the number of the light emitters. Thereby it is possible to extend a reached distance of the distance measuring light 41, and it is possible to extend a measurable distance.

Further, since the one-dimensional diffusion optical element 28 which diffuses the distance measuring light 41 in the only laminating direction (one direction) of the light emitters as the light projecting optical system 33 is used, it is possible to superimpose all the distance measuring lights 41*a*, 41*b* and 41*c* emitted from the respective light emitters and form the overlapping portion 46*d* in which beam profiles are uniformed.

Therefore, even if any portion of the distance measuring light 41 of the overlapping portion 46*d* is used and the corner cube 46 is measured, it is possible to obtain uniform distance measurement results regardless of the number of laminated light emitters and improve a distance measurement accuracy.

Further, even in a case where a scan is performed with the distance measuring light 41 and the corner cube 46 is measured, it is possible to obtain a distribution of the received light amounts continuous in both the "V" axis direction and the "H" axis direction, the arithmetic control module 17 can calculate an accurate gravity center position of the corner cube 46 and improve an angle measurement accuracy of the corner cube 46. Therefore, since it is possible to improve the distance measurement accuracy and the angle measurement accuracy by the one-dimensional diffusion optical element 28, the measurement accuracy of the surveying instrument 1 is improved.

Further, in a case whrer the corner cube 46 is measured with the distance measuring light 41 of any other portion than the overlapping portion 46*d*, a difference is produced in received light amounts of the reflected distance measuring light 42 as compared with a case where the corner cube 46 is measured with the distance measuring light 41 of the overlapping portion 46*d*.

Therefore, by discarding a measurement result of the corner cube 46 measured with the distance measuring light 41 of any portion other than the overlapping portion 46*d* based on the difference in received light amounts of the reflected distance measuring light 42, it is possible to eliminate a measurement result having an error and improve the measurement accuracy.

Further, the one-dimensional diffusion optical element 28 is a one-dimensional diffusion optical element which diffuses the distance measuring light 41 in one direction alone, and it is capable of allowing a beam diameter of the distance measuring light 41 to be smaller than that of two-dimensional diffusion optical element which diffuses the distance measuring light 41 in two directions.

Therefore, it is possible to increase a received light amount of the reflected distance measuring light 42 and extend a measurable distance.

Further, the light receiving prism 35 is used as the light receiving optical system 37, and the reflected distance measuring light 42 is internally reflected in the light receiving prism 35 more than once. Thereby, an optical path of the reflected distance measuring light 42 is bent, and an optical path length for a focal distance of the focusing lens 36 is assured.

Therefore, since a length in an optical axis direction of the light receiving optical system 37 can be shortened, it is possible to miniaturize an optical system of the light distance measuring unit 19 and also miniaturize the entire surveying instrument.

It is to be noted that, in the first embodiment, the multi-stack laser light source which has three light emitters laminated in one direction is used as the light emitting module 25. On the other hand, the light emitting module 25 may be a multi-stack laser light source in which two light emitters are laminated or may be a multi-stack laser light source in which four or five light emitters are laminated.

Further, in the first embodiment, the one-dimensional diffusion optical element 28 is provided on the distance measuring optical axis 38, and the one-dimensional diffusion optical element 28 may be insertable into and removable from the distance measuring optical axis 38 by a driving mechanism such as a solenoid. By making the one-dimensional diffusion optical element 28 insertable and removable, it is possible to proper use of the distance measuring light 41 depending on an object. For instance, the one-dimensional diffusion optical element 28 enables inserting onto the distance measuring optical axis 38 in case of performing the prism measurement and the one-dimensional diffusion optical element 28 enables removing from the distance measuring optical axis 38 in case of performing the non-prism measurement, the workability can be improved.

Further, in the first embodiment, the surveying instrument 1 is a laser scanner, but it is needless to say that the configuration of the first embodiment enables performing even if a total station is used.

Figure 7:
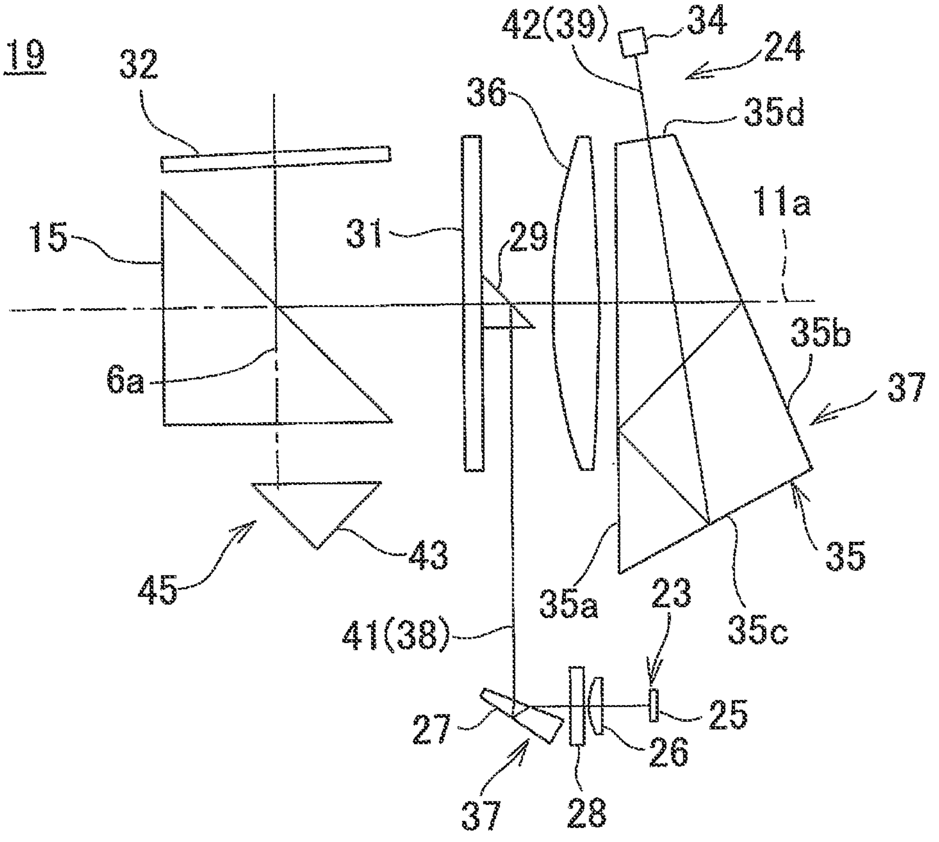
FIG. 7 is a block diagram to show a distance measuring unit according to a modification of a first embodiment of the present invention.

In the first embodiment, the one-dimensional diffusion optical element 28 is arranged between the beam shaping optical element 27 and the reflecting prism 29, but the one-dimensional diffusion optical element 28 may be provided at other positions. For instance, as shown in FIG. 7, the one-dimensional diffusion optical element 28 may be arranged between the collimator lens 26 and the beam shaping optical element 27.

Further, in a case where a use of the surveying instrument 1 is restricted to the prism measurement alone, that is, in a case where the one-dimensional diffusion optical element 28 is fixed with respect to the distance measuring optical axis 38, the one-dimensional diffusion optical element 28 may be arranged between the fixing member 31 and the scanning mirror 15, or the one-dimensional diffusion optical element 28 may be arranged between the scanning mirror 15 and the window unit 32. Further, in place of the one-dimensional diffusion optical element 28, a thin film having an optical action to diffuse a light in a one-dimensional direction may be formed on the reflecting prism 29, on the fixing member 31, on the scanning mirror 15, or on the window unit 32.

Further, in the first embodiment, an elliptic diffusion film, a binary optical element, or a diffractive optical element is used as the one-dimensional diffusion optical element 28. On the other hand, a cylindrical lens, a lenticular lens, or a micro-cylindrical lens array may be used as the one-dimensional diffusion optical element 28.

Figure 8:
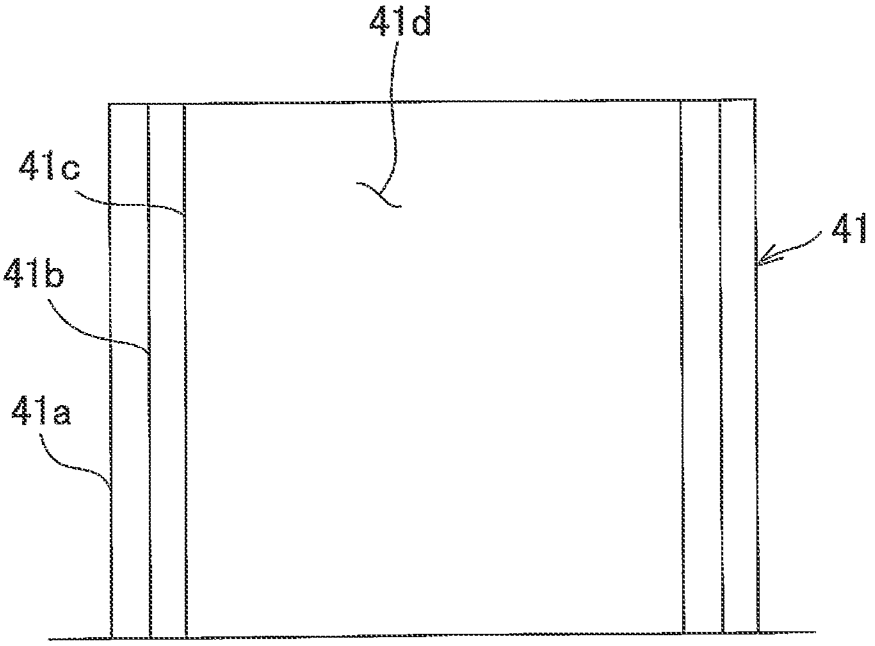
FIG. 8 is the profile section intensity of each distance measuring light according to a modification of the first embodiment of the present invention.

In a case where the cylindrical lens, the lenticular lens, or the micro-cylindrical lens array is used and they are further aspherized and optimized, like the profile section intensity of each distance measuring light show in FIG. 8, it is possible to uniform a beam profile of the distance measuring light 41 over its entire area. Therefore, the measurement accuracy can be improved.

Figure 9A:
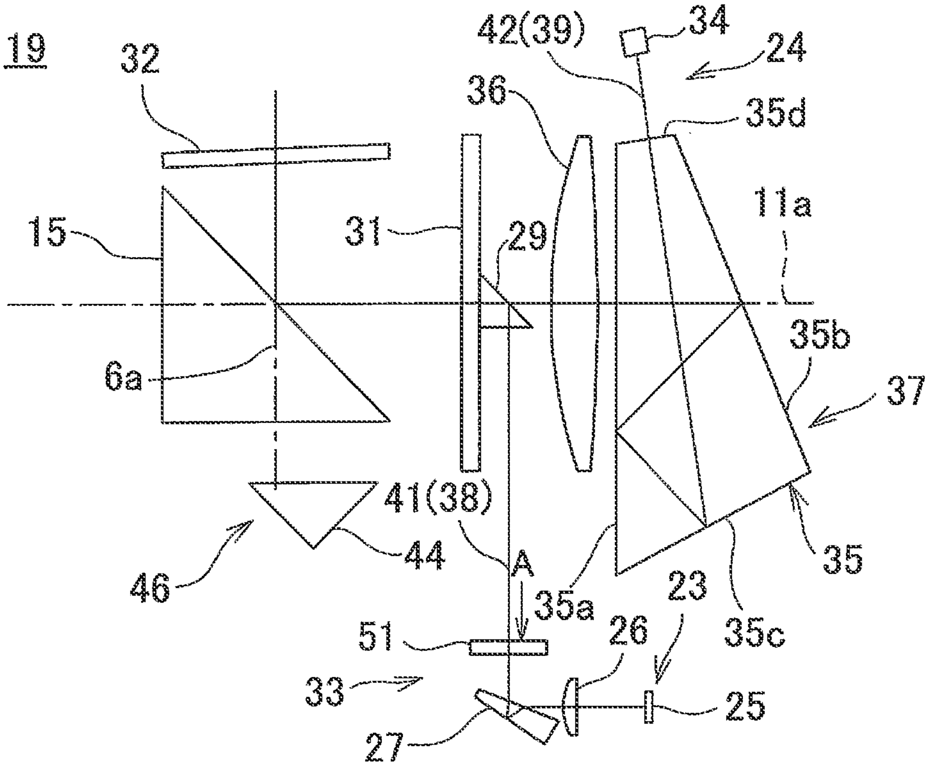
FIG. 9A is a block diagram to show a distance measuring unit according to a second embodiment of the present invention.

Next, by referring to FIG. 9A and FIG. 9B, a description will be given on a second embodiment of the present invention. It is to be noted that, in FIG. 9A, the same components as shown in FIG. 2A and FIG. 2B are referred by the same symbols, and detailed description thereof will be omitted.

In the second embodiment, a slit plate 51 is used as a one-dimensional diffusion optical member. The slit plate 51 is provided between a beam shaping optical element 27 and a reflecting prism 29 like the one-dimensional diffusion optical element 28 (see FIG. 2) in the first embodiment.

Figure 9B:
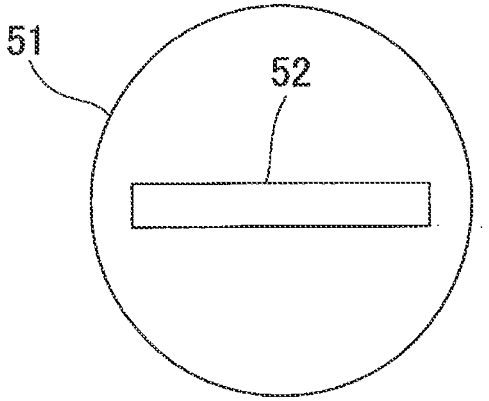
FIG. 9B is an "A" arrow view of FIG. 9A.

Further, as shown in FIG. 9B, the slit plate 51 is, for instance, a circular disk having a slit hole 52 formed at the center. By passing a distance measuring light 41 deflected by the beam shaping optical element 27 through the slit hole 52, the distance measuring light 41 is configured to be diffracted by the slit hole 52, and to be diffused in a predetermined direction (a one-dimensional direction). In the second embodiment, the slit hole 52 is a slit extending in a direction orthogonal with respect to a laminating direction (a stacking direction) of a light emitting module 25, and a diffusing direction of the distance measuring light 41 is the laminating direction of respective light emitters.

It is to be noted that an aperture size of the slit hole 52 is appropriately set from 0.05×5 mm to 1×20 mm in correspondence with a distance to an object. For instance, the aperture size of the slit hole 52 sets to 0.4×10 mm.

A distance measuring unit 19 is controlled by an arithmetic control module 17 (see FIG. 1). When the pulsed distance measuring light 41 is projected onto a distance measuring optical axis 38 from the light emitting module 25, the distance measuring light 41 is turned to a parallel light flux by a collimator lens 26 and deflected at a right angle while correcting its beam shape by the beam shaping optical element 27. The distance measuring light 41 reflected by the beam shaping optical element 27 is diffused in a laminating direction of light emitters by the slit hole 52 of the slit plate 51, and then reflected at a right angle by a reflecting prism 29. The distance measuring light 41 projected from the reflecting prism 29 is deflected at a right angle by the scanning mirror 15 and irradiated to an object, for instance, a corner cube 46 via a window unit 32.

A reflected distance measuring light 42 reflected by the corner cube 46 is received by a photodetector 34 via the scanning mirror 15 and a light receiving optical system 37, and the distance measurement of the corner cube 46 is performed.

In the second embodiment, the slit plate 51 having the slit hole 52 extending in a direction orthogonal to the laminating direction (the stacking direction) of the light emitters is used. Therefore, the distance measuring lights 41 of the respective light emitters are diffused only in a one-dimensional direction, namely, the laminating direction (the stacking direction) of the light emitters, and the distance measuring lights 41 of the respective light emitters are superimposed, averaged, and then projected. Further, since the profile section intensities at that time are detected with the distance measuring lights 41 of the respective light emitters being superimposed and combined, beam intensities of beam sections of the distance measuring lights 41 are substantially constant.

An overlapping portion 41*d* (see FIG. 3B) of the distance measuring lights 41*a*, 41*b* and 41*c*, which have been superimposed due to the diffraction when passing through the slit hole 52, is configured to be received in a light receiving range 48 (see FIG. 4B). Therefore, in the second embodiment, likewise, it is possible to obtain the same effects as the configuration in the first embodiment. For instance, by reflecting the overlapping portion 41*d* by the corner cube 46, the errors in distance measurement result are prevented.

It is to be noted that, in the second embodiment, the slit plate 51 is provided on the distance measuring optical axis 38. On the other hand, the slit plate 51 may be insertable into and removable from the distance measuring optical axis 38 by a driving mechanism such as a solenoid. By making the slit plate 51 insertable and removable, it is possible to proper use of a beam profile of the distance measuring light 41 corresponding with an object, for instance, to insert of the slit plate 51 onto the distance measuring optical axis 38 in case of performing the prism measurement and to remove of the slit plate 51 from the distance measuring optical axis 38 in case of performing the non-prism measurement, the workability can improve.

Further, in the second embodiment, the slit plate 51 is arranged between the beam shaping optical element 27 and the reflecting prism 29, but the slit plate 51 may be provided at other positions. For instance, similar to FIG. 7 in the first embodiment, the slit plate 51 may be arranged between the collimator lens 26 and the beam shaping optical element 27.

Further, in a case where a use of the surveying instrument 1 is restricted to the prism measurement alone, that is, in a case where the slit plate 51 is fixed with respect to the distance measuring optical axis 38, the slit plate 51 may be arranged between a fixing member 31 and the scanning mirror 15, or the slit plate 51 may be arranged between the scanning mirror 15 and the window unit 32. Further, in place of the slit plate 51, a thin film having a slit portion formed may be formed on the reflecting prism 29, on the fixing member 31, or on the window unit 32. The thin film is formed in such a manner that, for instance, the distance measuring light 41 is not transmitted through portions other than the slit portion.

Further, in the second embodiment, as the one-dimensional diffusion optical member, the slit plate 51 having the slit hole 52 formed is used. On the other hand, the one-dimensional diffusion optical member is not restricted to the slit plate 51.

Figure 10A:
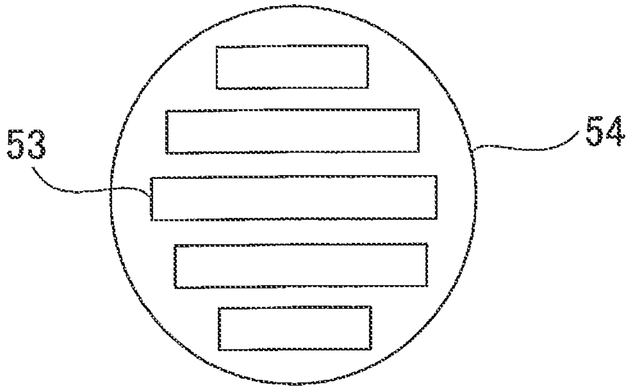
FIG. 10A, FIG. 10B, FIG. 10C are explanatory drawings to show modifications of the one-dimensional diffusion optical member according to a second embodiment of the present invention.

For instance, as shown in FIG. 10A, a slit plate 54 which formed a plurality of slit holes 53 in a circular disk may be used. By using the slit plate 54, the distance measuring lights 41*a*, 41*b* and 41*c* emitted from the respective light emitters are diffracted and combined when the distance measuring lights 41*a*, 41*b* and 41*c* pass through the slit holes 53, and resulted the distance measuring light 41 including the overlapping portion 41*d*. It is to be noted that, in FIG. 10A, the five slit holes 53 are formed in the slit plate 54, but the number of the slit holes 53 may be four or less, or may be six or more.

Further, a parallel flat glass plate having slits formed by an etching process may be used, instead of forming slit holes in a circular disk, as in the slit plate 51 or the slit plate 54.

Figure 10B:
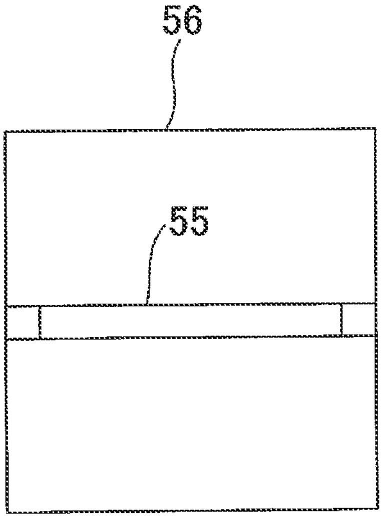
Figure 10C:
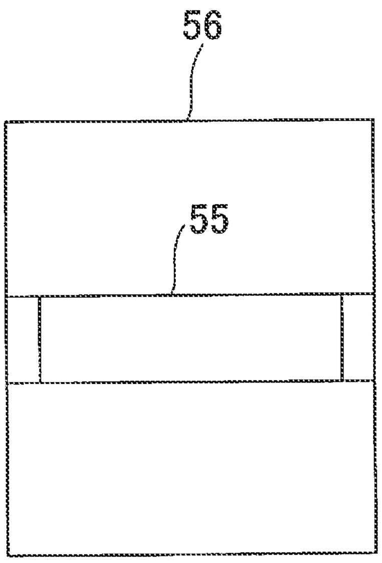

Further, as shown in FIG. 10B and FIG. 10C, a slit plate 56 in which an aperture width of a slit hole 55 is changeable in a laminating direction of the respective light emitters may be used. The opening and closing of the slit hole 55 are motor-controlled by, for instance, the arithmetic control module 17. By enabling changing the aperture width of the slit hole 55, it is possible to change a diffusion angle of the distance measuring light 41 and change a range of the distance measuring light 41 (a size of the overlapping portion 41*d*) which is reflectable by the corner cube 46 in the prism measurement.

The invention claimed is:

1. A surveying instrument comprising: a distance measuring light projecting module having a light emitting module configured to project a distance measuring light to an object and a one-dimensional diffusion optical member configured to diffuse said distance measuring light in a one-dimensional direction, a distance measuring light receiving module having a photodetector configured to receive a reflected distance measuring light from said object, and an arithmetic control module configured to control said light emitting module and calculate a distance to said object based on a light reception result of said reflected distance measuring light with respect to said photodetector, wherein said light emitting module has at least two light emitters laminated in one direction, and said one-dimensional diffusion optical member is configured to diffuse said distance measuring light in a laminating direction of said light emitters.

2. The surveying instrument according to claim 1, wherein said one-dimensional diffusion optical member is a one-dimensional diffusion optical element.

3. The surveying instrument according to claim 1, wherein said one-dimensional diffusion optical member is a slit plate having a slit extending in a direction orthogonal to a laminating direction of said light emitters.

4. The surveying instrument according to claim 1, wherein the object is a corner cube having the retro-reflective property, and said distance measuring light diffused by said one-dimensional diffusion optical member is configured in such a manner that an overlapping portion in which lights emitted from said respective light emitters are all overlapped is formed, and said arithmetic control module performs the distance measurement of said corner cube by said overlapping portion.

5. The surveying instrument according to claim 4, further comprising a frame unit configured to horizontally rotate around a horizontal rotation shaft by a horizontal rotation motor, a scanning mirror configured to vertically rotate around a vertical rotation shaft by a vertical rotation motor provided in said frame unit, to irradiate said corner cube with said distance measuring light, and to receive said reflected distance measuring light from said corner cube, a horizontal angle encoder configured to detect a horizontal angle of said frame unit, and a vertical angle encoder configured to detect a vertical angle of said scanning mirror, wherein said arithmetic control module is configured to calculate a gravity center position of said corner cube based on a received light amount, a horizontal angle, and a vertical angle of said reflected distance measuring light at the time of scanning said corner cube with said distance measuring light and perform the angle measurement of said corner cube based on said gravity center position.

6. The surveying instrument according to claim 4, wherein said arithmetic control module is configured to determine whether said corner cube has been performed the distance measurement with the overlapping portion based on a received light amount of said reflected distance measuring light, and discard a distance measurement result in which distance measurement is determined to have not been performed with said overlapping portion.

7. The surveying instrument according to claim 5, wherein said arithmetic control module is configured to calculate a gravity center position of said corner cube based on a light amount distribution obtained at the time of scanning said corner cube with said distance measuring light, to determine whether said corner cube has been performed the distance measurement with said overlapping portion based on whether said corner cube is within a preset threshold range set in advance to said gravity center position, and to discard a distance measurement result in which distance measurement is determined to have not been performed by said overlapping portion.

8. The surveying instrument according to claim 1, wherein said distance measuring light projecting module further comprises a driving mechanism, and said driving mechanism is configured to insert or remove said one-dimensional diffusion optical member with respect to an optical axis of said distance measuring light.

9. The surveying instrument according to claim 1, wherein said distance measuring light receiving module further has a light receiving prism configured to internally reflect said reflected distance measuring light more than once and then cause said reflected distance measuring light to be received by said photodetector.

10. The surveying instrument according to claim 3, wherein said slit plate has one slit hole.

11. The surveying instrument according to claim 3, wherein said slit plate is a plurality of slit holes.

12. The surveying instrument according to claim 10, wherein an aperture width of said slit hole is changeable in a laminating direction of said light emitters, and said arithmetic control module is configured to change said aperture width of said slit hole in said laminating direction of said light emitters.

13. The surveying instrument according to claim 2, wherein the object is a corner cube having the retro-reflective property, and said distance measuring light diffused by said one-dimensional diffusion optical member is configured in such a manner that an overlapping portion in which lights emitted from said respective light emitters are all overlapped is formed, and said arithmetic control module performs the distance measurement of said corner cube by said overlapping portion.

14. The surveying instrument according to claim 3, wherein the object is a corner cube having the retro-reflective property, and said distance measuring light diffused by said one-dimensional diffusion optical member is configured in such a manner that an overlapping portion in which lights emitted from said respective light emitters are all overlapped is formed, and said arithmetic control module performs the distance measurement of said corner cube by said overlapping portion.

15. The surveying instrument according to claim 13, further comprising a frame unit configured to horizontally rotate around a horizontal rotation shaft by a horizontal rotation motor, a scanning mirror configured to vertically rotate around a vertical rotation shaft by a vertical rotation motor provided in said frame unit, to irradiate said corner cube with said distance measuring light, and to receive said reflected distance measuring light from said corner cube, a horizontal angle encoder configured to detect a horizontal angle of said frame unit, and a vertical angle encoder configured to detect a vertical angle of said scanning mirror, wherein said arithmetic control module is configured to calculate a gravity center position of said corner cube based on a received light amount, a horizontal angle, and a vertical angle of said reflected distance measuring light at the time of scanning said corner cube with said distance measuring light and perform the angle measurement of said corner cube based on said gravity center position.

16. The surveying instrument according to claim 14, further comprising a frame unit configured to horizontally rotate around a horizontal rotation shaft by a horizontal rotation motor, a scanning mirror configured to vertically rotate around a vertical rotation shaft by a vertical rotation motor provided in said frame unit, to irradiate said corner cube with said distance measuring light, and to receive said reflected distance measuring light from said corner cube, a horizontal angle encoder configured to detect a horizontal angle of said frame unit, and a vertical angle encoder configured to detect a vertical angle of said scanning mirror, wherein said arithmetic control module is configured to calculate a gravity center position of said corner cube based on a received light amount, a horizontal angle, and a vertical angle of said reflected distance measuring light at the time of scanning said corner cube with said distance measuring light and perform the angle measurement of said corner cube based on said gravity center position.

17. The surveying instrument according to claim 5, wherein said arithmetic control module is configured to determine whether said corner cube has been performed the distance measurement with the overlapping portion based on a received light amount of said reflected distance measuring light, and discard a distance measurement result in which distance measurement is determined to have not been performed with said overlapping portion.

18. The surveying instrument according to claim 13, wherein said arithmetic control module is configured to determine whether said corner cube has been performed the distance measurement with the overlapping portion based on a received light amount of said reflected distance measuring light, and discard a distance measurement result in which distance measurement is determined to have not been performed with said overlapping portion.

19. The surveying instrument according to claim 14, wherein said arithmetic control module is configured to determine whether said corner cube has been performed the distance measurement with the overlapping portion based on a received light amount of said reflected distance measuring light, and discard a distance measurement result in which distance measurement is determined to have not been performed with said overlapping portion.

20. The surveying instrument according to claim 15, wherein said arithmetic control module is configured to calculate a gravity center position of said corner cube based on a light amount distribution obtained at the time of scanning said corner cube with said distance measuring light, to determine whether said corner cube has been performed the distance measurement with said overlapping portion based on whether said corner cube is within a preset threshold range set in advance to said gravity center position, and to discard a distance measurement result in which distance measurement is determined to have not been performed by said overlapping portion.

* * * * *